United States Patent [19]

Doane et al.

[11] Patent Number: 4,981,318
[45] Date of Patent: Jan. 1, 1991

[54] MOBILE SERVICE APPARATUS

[76] Inventors: Frederick G. Doane, Rte. 1, Box 536, Delavan, Wis. 53115; Kenneth F. Doane, S103W38296 Hwy., NN, Eagle, Wis. 53119

[21] Appl. No.: 488,631

[22] Filed: Mar. 5, 1990

[51] Int. Cl.⁵ .................. B60P 3/07; B62D 33/02; B62D 33/04
[52] U.S. Cl. .................. 296/24.1; 296/26; 296/181
[58] Field of Search .................. 296/24.1, 26, 181

[56] References Cited

U.S. PATENT DOCUMENTS

| | | | |
|---|---|---|---|
| 1,317,044 | 9/1919 | Shannon | 296/24.1 |
| 2,491,044 | 12/1949 | Holland | 280/656 |
| 2,765,938 | 10/1956 | Di Addezio | 137/234.6 X |
| 2,790,673 | 4/1957 | Nieden | 296/171 |
| 2,811,111 | 10/1957 | Levitz et al. | 296/24.1 X |
| 2,906,556 | 9/1959 | Cantele et al. | 296/26 |
| 3,070,399 | 12/1962 | Bartlett | 296/26 |
| 3,308,845 | 3/1967 | Bellas et al. | 137/234.6 |
| 3,492,042 | 1/1970 | Nachtigall, Jr. | 296/24.1 |
| 3,697,123 | 10/1972 | Gygrynuk | 296/24.1 |
| 3,740,088 | 6/1973 | Ratcliff | 296/26 X |
| 3,913,934 | 10/1975 | Koehn et al. | 280/656 |
| 4,015,858 | 4/1977 | Love | 280/656 |
| 4,055,206 | 10/1977 | Griffin | 296/24.1 X |
| 4,114,942 | 9/1978 | Greiner | 296/26 X |
| 4,119,224 | 10/1978 | Moody | 280/656 |
| 4,221,398 | 9/1980 | Pautrat | 280/444 |
| 4,469,364 | 9/1984 | Rafi-Zadeh | 296/24.1 X |
| 4,546,578 | 10/1985 | Behrmann | 296/26 X |
| 4,724,875 | 2/1988 | Baldwin et al. | 137/234.6 X |
| 4,789,281 | 12/1988 | Westerdale | 296/26 X |

FOREIGN PATENT DOCUMENTS 1232838 1/1967 Fed. Rep. of Germany ........ 296/26

*Primary Examiner*—Margaret A. Focarino
*Assistant Examiner*—Andrew C. Pike
*Attorney, Agent, or Firm*—Fitch, Even, Tabin & Flannery

[57] ABSTRACT

Mobile service apparatus for movement from a first location to a second location includes a frame. The frame includes a floor upon which a vehicle to be serviced can be moved with the frame having a forward end, a rearward end, and spaced sides extending between the ends. A roof is provided supported by the frame and overlying the floor, and the apparatus has at least one corner post assembly positioned adjacent one end of the frame and adjacent one side of the frame for maintaining the roof space above the floor. The corner post assembly includes a generally horizontally extending upper arm movably held by the roof, a generally horizontally extending lower arm movably held by the frame and underlying the upper arm, and a spacer joining the upper and lower arms. The corner post assembly is movable between a closed position in which the spacer is located between the frame sides, and an open position in which the spacer is located outwardly of the one frame side so that, with the assembly in its open position, a vehicle extending beyond the frame one side can be moved onto the floor without interference from the corner post assembly.

20 Claims, 5 Drawing Sheets

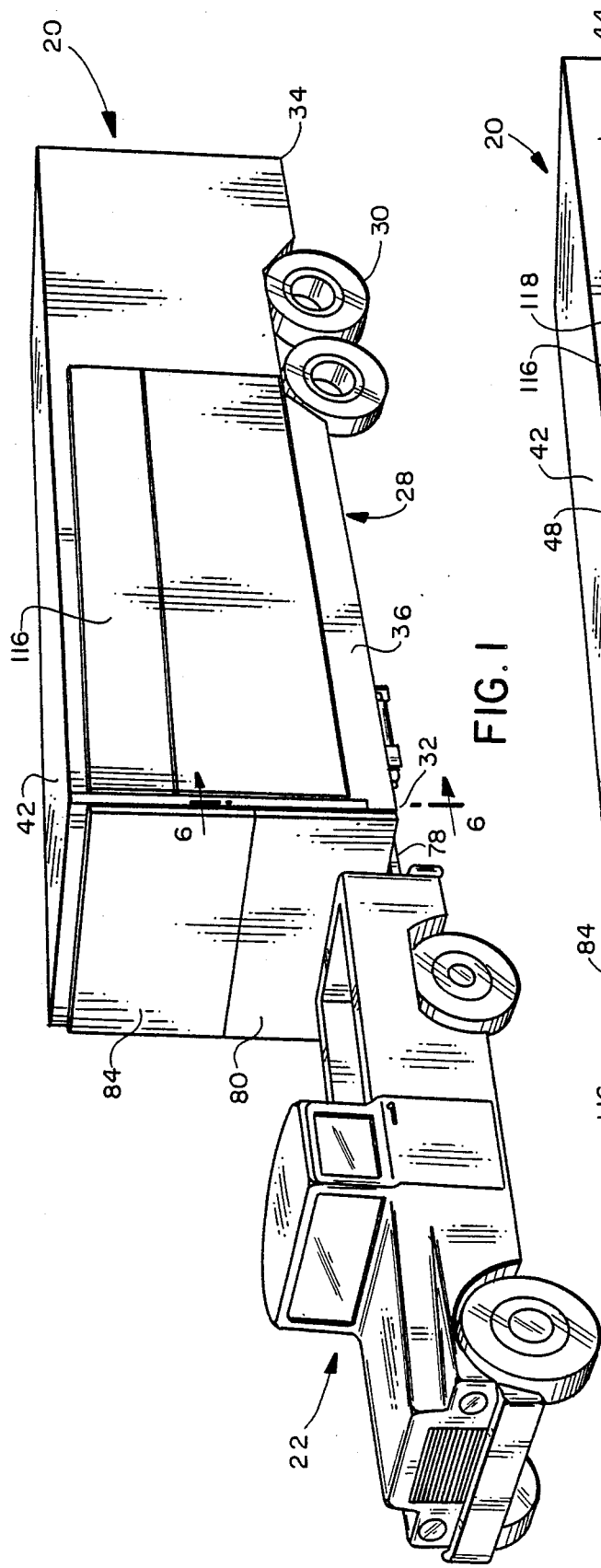
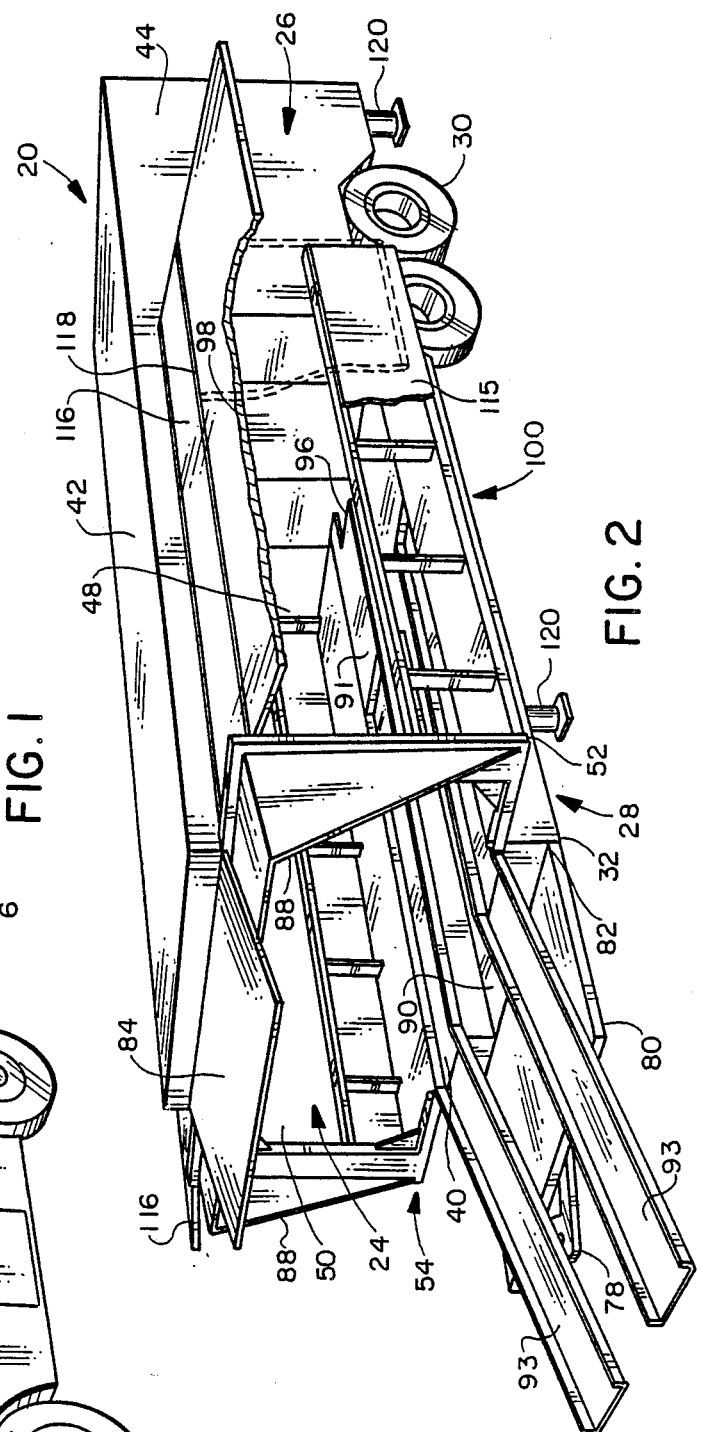

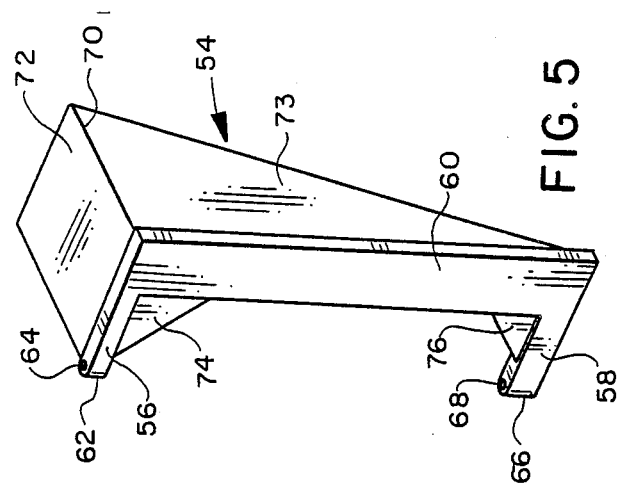
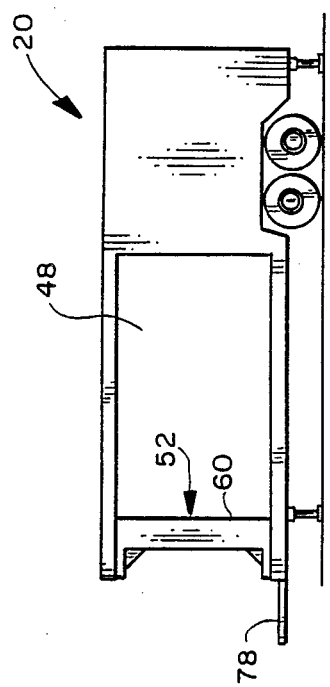
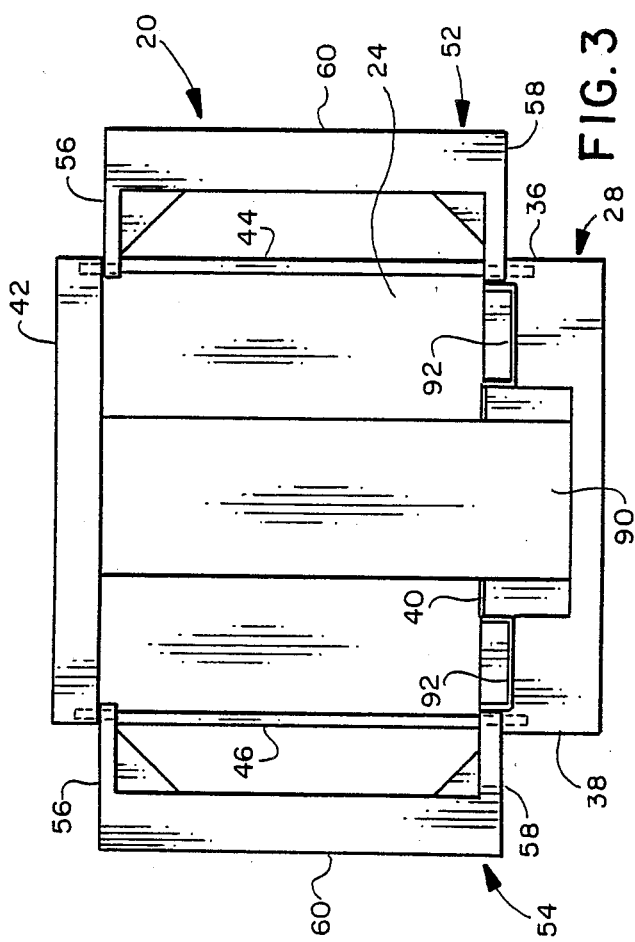
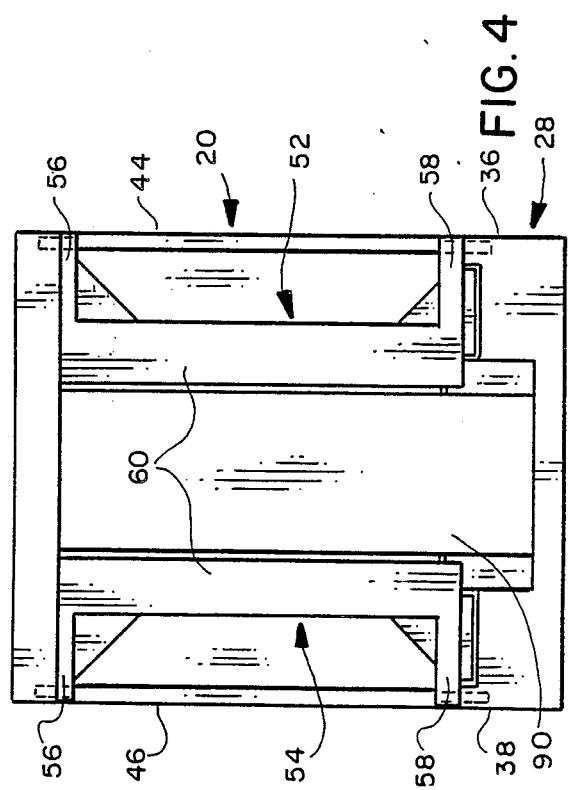

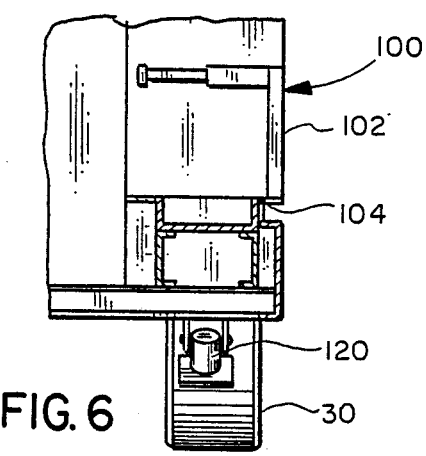
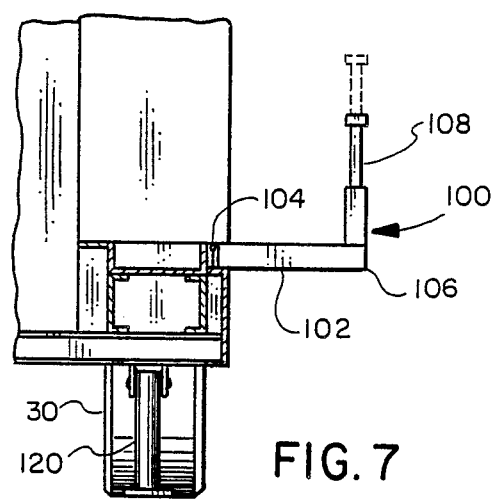
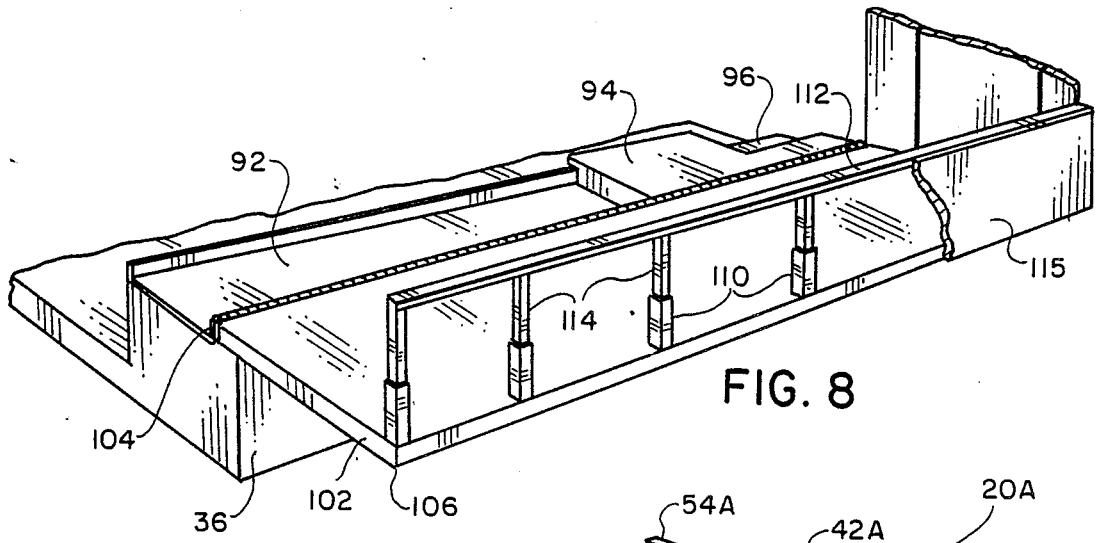
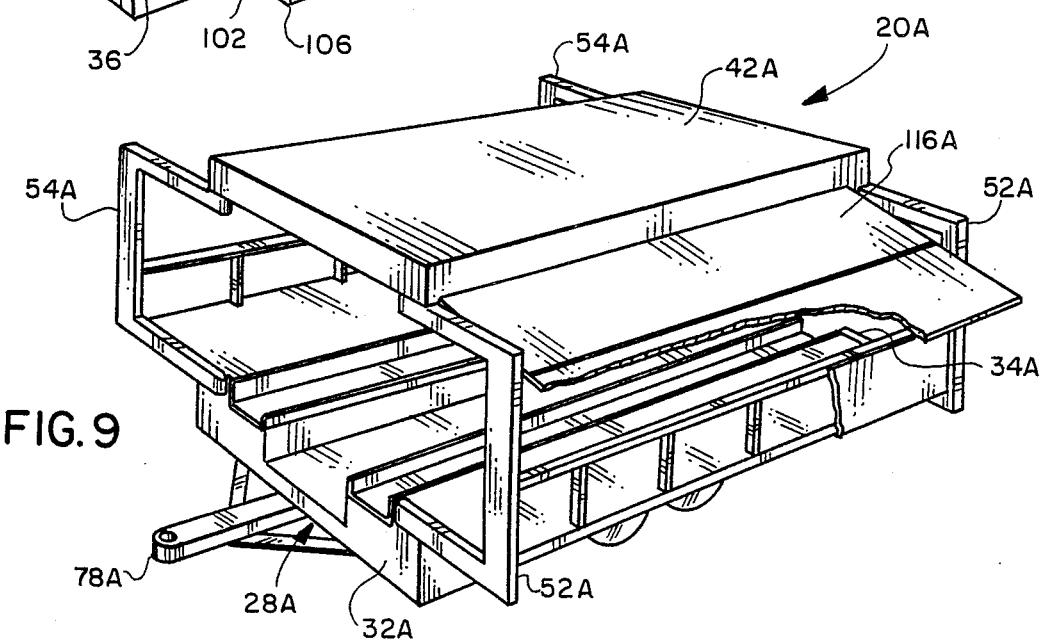

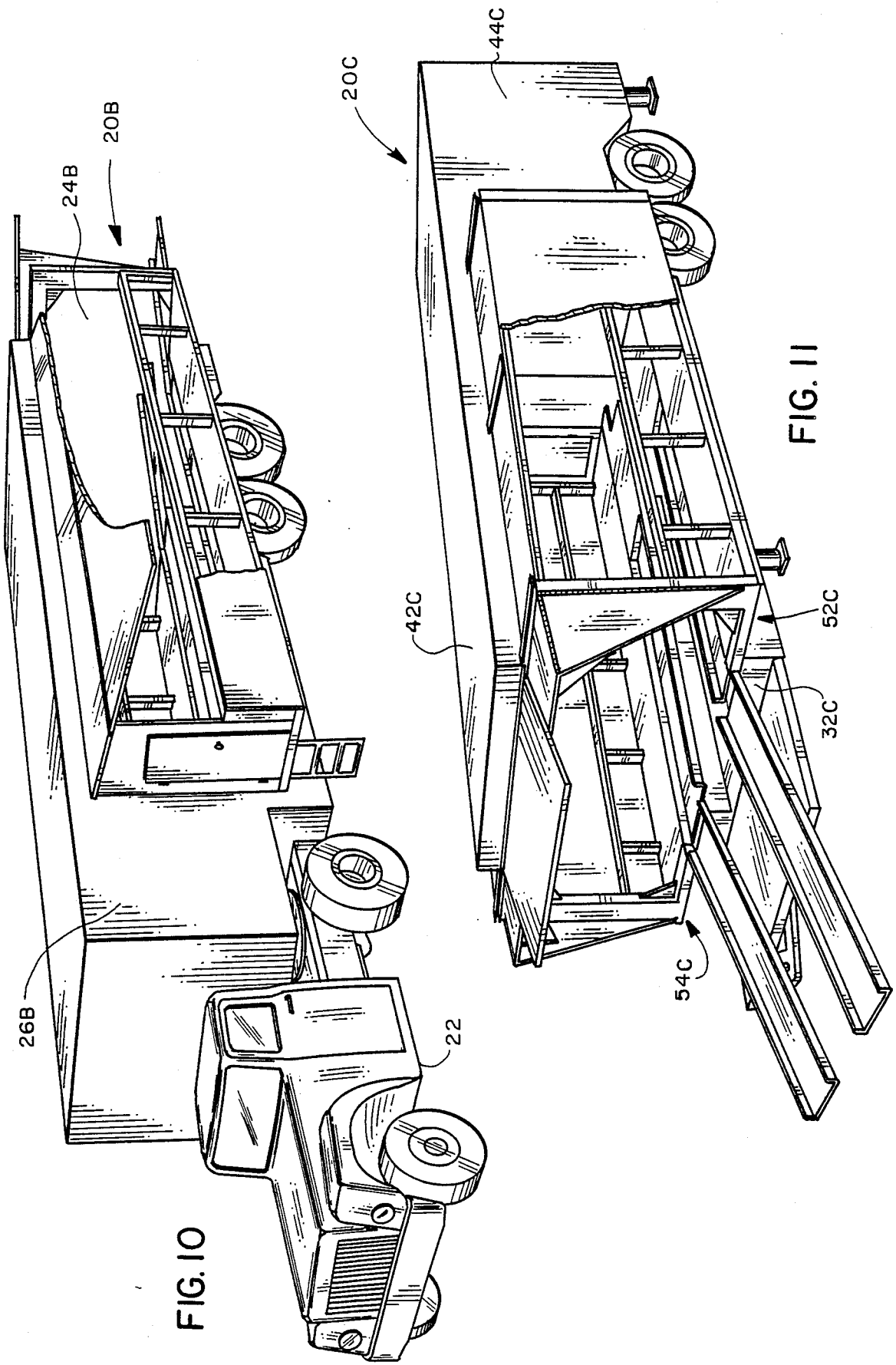

MOBILE SERVICE APPARATUS

This invention relates to mobile equipment for servicing vehicles and, more particularly, to a mobile service that can be transported and into which the vehicle to be serviced can be moved.

BACKGROUND OF THE INVENTION

It is becoming more difficult for the typical vehicle owner to obtain proper vehicle servicing without expending considerable time driving to a remote location and waiting for the vehicle servicing to be completed. The problem is exacerbated by the sharp reduction in the number of neighborhood full service gas stations and the increased complexity of modern vehicles. The result is often that proper vehicle servicing is postponed or entirely neglected.

Over the years various mobile service units have been proposed for providing necessary vehicle servicing, such as oil change, lubrication, engine tune-up . . . , etc., at locations convenient to the vehicle owner such as at a parking lot or other place where owners ordinarily leave their vehicles. Thus the general idea is that the service station comes to the vehicle as opposed to the vehicle going to the service station. One of the problems with such mobile units was that the work area was open thus making them unsuitable for use in inclement weather. For further information on the structure and operation of such units, reference may be made to U.S. Pat. Nos. 2,765,938 and 4,724,875.

U.S. Pat. No. 3,308,845 to Bellas et al. shows a mobile service station trailer having a roof and sides which can be repositioned at outward locations to increase the area within the trailer for a service attendant to work. More specifically, the sides of the trailer have swingable side portions, pivotally attached at their upper and lower ends, respectively. The sides also have a door section which has a hinge portion disposed in a vertical plane, so that the door can be pivoted outwardly, and a collapsible folding door section can be installed to complete the outward disposition of the sides. However, the width of the vehicle that can be driven onto the trailer is limited so small trucks, vans and large automobiles may not be able to be accommodated. Of course, various state and Federal laws limit the width of a trailer which can be towed on public roads and highways.

U.S. Pat. No. 4,119,224 to Moody is directed to a trailer having outer rail portions which can be moved outwardly in a horizontal plane by virtue of telescoping members to increase the width of the trailer permitting accommodation of large farm machinery. U.S. Pat. No. 3,913,934 to Koehn et al. also discloses a variable width trailer for farm or construction machinery.

SUMMARY OF THE INVENTION

Among the several aspects and features of this invention may be noted the provision of improved mobile service apparatus. The apparatus is preferably a trailer so that a single towing vehicle can be employed, at different times, to move a number of trailers. The trailer can be reconfigured from a closed condition in which it has a width sufficiently small that the trailer can be legally towed over public roads, to an open condition in which it can receive for servicing large automobiles and other vehicles which could not be received by the trailer in its closed condition. The trailer provides the service attendant with a safe, sheltered environment in its open condition, and the trailer is relatively easy to reconfigure. This trailer is reliable in use, has relatively long service life, and is relatively easy and economical to manufacture. Other aspects and features of this invention will be, in part, apparent and, in part, pointed out hereinafter in the specification and accompanying drawings.

Mobile service apparatus embodying various aspects of this invention includes a frame having a floor onto which a vehicle can be moved. The apparatus includes a roof supported by the frame and overlying the floor, and one or more corner post assemblies positioned adjacent a corner of the frame for maintaining the roof spaced above the floor. Each corner post assembly includes upper and lower horizontally extending arms movably held by the roof and the frame, respectively. The corner post assembly also includes a spacer interconnecting the upper and lower arms with the corner post assembly being movable between a closed position in which the spacer is located between the frame sides and an open position in which the spacer is located outwardly of the frame sides.

BRIEF DESCRIPTION OF THE DRAWINGS

FIG. 1 is a perspective view of a mobile service trailer embodying various aspects of the present invention, shown in its closed condition, hitched to a truck for transportation to a service location;

FIG. 2, similar to FIG. 1, shows the trailer in its open condition at a service location unhitched from the truck and ready to receive vehicles;

FIG. 3 is a front elevational view of the trailer showing roof support corner posts swung to their extended position to permit entrance into the trailer of a relatively wide vehicle;

FIG. 4, similar to FIG. 3, illustrates the corner posts in their retracted position;

FIG. 4A is a reduced scale, simplified side elevational view illustrating the corner post pivoted beyond its extended position so that the spacer of the corner post is generally flush with the side of the trailer;

FIG. 5 is perspective view of one of the corner posts;

FIG. 6 is a partial sectional view depicting a pivotally mounted service platform in its closed position;

FIG. 7, similar to FIG. 6, illustrates the platform in its open or extended position;

FIG. 8 is a perspective view of a portion of the service platform in its extended position;

FIG. 9 is a perspective view of an alternative embodiment of a mobile service trailer embodying various aspects of the present invention;

FIG. 10 is a perspective view of a second alternative embodiment of a mobile service trailer of the present invention;

FIG. 11 is a perspective view of a third alternative embodiment of a mobile service trailer of the present invention, in which the corner posts slide as opposed to swing;

Corresponding reference characters indicate corresponding parts throughout the several views of the drawings.

DESCRIPTION OF THE PREFERRED EMBODIMENTS

Figure 12:
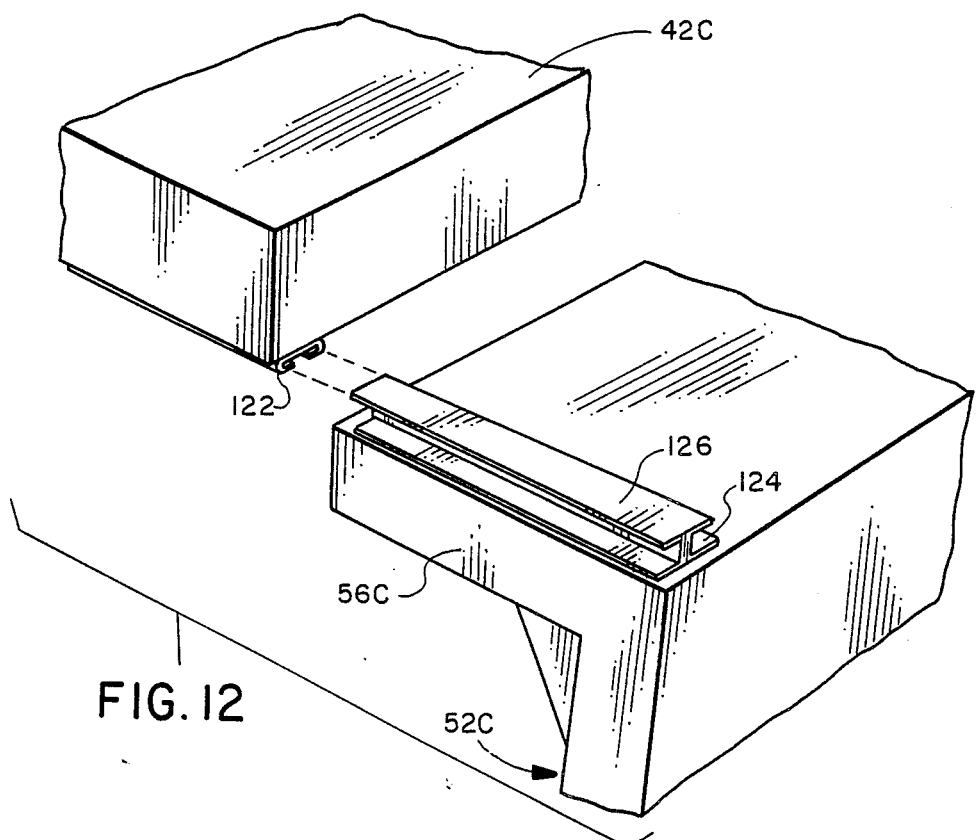
FIG. 12 is a detail illustrating a track dependent from the roof of the trailer of FIG. 11, and a flange carried by the corner post for being held and slidably guided by the track.

Referring now to the drawings, mobile service apparatus embodying various aspects of the present invention is generally indicated by reference numeral 20 in FIGS. 1–4A. The apparatus 20 is preferably a trailer adapted to be towed by a truck 22 from location to location to service vehicles; however, the apparatus does not require wheels as it could be lifted or slid from a truck bed. Additionally, the apparatus could be integral with a truck. The trailer preferably includes a service bay 24 for receiving a vehicle to be serviced and a storage area 26 for holding tools and supplies for servicing the vehicle. The storage area can be located at the rear of the trailer so that the added weight of the tools and supplies is more effectively carried by the wheels of the trailer. In its closed condition shown in FIGS. 1 and 4, the trailer has a maximum width within the statutory limit so that the trailer can be legally towed using public roads. The legal limit without a special permit is typically 96 inches whereas special permits can usually be obtained to tow a trailer under certain restrictions having a maximum width of typically 102 inches. In its open condition shown in FIGS. 2 and 3, the service bay 24 can accommodate a vehicle having a maximum width greater than the width of the trailer in its closed condition.

More specifically, the trailer 20 includes a frame 28 supported by wheels 30 and having a forward end 32, a rearward end 34, and spaced sides 36, 38 extending between the ends. The frame also has a floor 40 onto which the vehicle to be serviced can be moved, and a roof 42 supported by the frame and overlying the floor. Furthermore, the trailer preferably has side walls 44, 46 extending between the trailer ends 32, 34 with each sidewall having a cutout portion 48, 50 extending to the forward end 32. Positioned adjacent the forward end 32 and adjacent each side 36, 38 of the frame is a corner post assembly 52, 54, for supporting the roof.

Referring to FIG. 5, the right side or passenger side corner post assembly 54 is shown. As the left side corner post assembly 52 is a mirror image of assembly 54, assembly 52 need not be discussed in detail. The corner post assembly 54 includes a horizontally extending upper arm 56 movably held by the roof, a horizontally extending lower arm 58 movably held by the frame and underlying the upper arm, and a spacer 60 joining the upper and lower arms. As shown in FIGS. 2 and 3, when in its open position, the spacer of each corner post assembly is located beyond the frame sides which, along with the provision of the cutout portions of the trailer side walls, permits entrance of an oversized vehicle into the service bay.

The upper arm 56 has a distal end 62 including a vertically disposed bore 64 for receiving a pin which extends into a socket in the roof 42. Similarly, the lower arm 58 has a distal end 66 including a vertical bore 68 for receiving a pivot pin extending into a socket in the frame 28. As the upper arm underlies the roof and the lower arm overlies the frame, the corner post assembly can be pivoted between its open and closed positions while at all times adequately supporting the roof. FIG. 4A shows the corner post pivoted beyond its open position so that the spacer is generally flush with the trailer side. This position can be used when the vehicles to be serviced are not especially wide, and has an advantage in that the corner post assemblies do not extend as far laterally.

The corner post assembly preferably includes a shield 70 extending away from the frame 28 when the assembly is in its open condition. The shield is formed by a generally horizontally disposed plate 72 extending from the upper arm 56, and by a generally vertically disposed plate 73 extending from the spacer 60 which interconnects the proximal ends of the upper and lower arms. A first strengthening fillet 74 joins the upper arm and the spacer, while a second strengthening fillet 76 joins the spacer and the lower arm.

As best shown in FIG. 2, a tongue 78 for attachment to the truck 22 extends from the forward end of the frame. A gate 80 has a lower end 82 hingedly attached to the frame below the level of the corner post assemblies and forwardly thereof. In the open condition of the trailer, the gate can lie in a horizontal plane supported by the tongue. In the closed condition of the trailer, the gate is vertically positioned, overlying the corner post assemblies. An awning 84 has an upper end 86 pivotally attached to the roof 42 above the corner post assemblies and can be supported in the open condition by the horizontal plates 72 of the corner post assemblies. The shields 70 and the awning 84 cooperate to provide a sheltered entrance to the service bay 24.

The floor 40 includes a central longitudinal depression 90 to permit access to the underside of the vehicle to be serviced by the service personnel. Flanking the depression are raised channels 92 for engagement by the tires of the vehicle being serviced. Portable ramps 93 are provided extending from the channels, over the gate 80, and to ground permitting the vehicle to be serviced to be moved into the bay. A raised work platform 94 at the end of the service bay serves as a stop to limit movement of the vehicle being serviced, and steps 96 are provided at the end of this raised platform leading to a central corridor 98 of the storage area, allowing the worker to move from the platform to the storage area and to underneath the vehicle.

Referring to FIGS. 6–8, an L-shaped catwalk assembly 100 is provided on each side of the bay to facilitate movement by the worker about the vehicle. As the catwalk assemblies are mirror images, only the right side assembly 100 need be described in detail. The catwalk assembly 100 includes a walkway portion 102 having a first side 104 and a second side 106, and a railing portion 108 extending away from the walkway portion adjacent the second side 106. The first side 104 is hingedly connected to the frame 28 adjacent side 36 so that the catwalk assembly is swingable between a closed position shown in FIG. 6 wherein it is positioned between the frame sides, and an open position, shown in FIG. 7, wherein it extends beyond frame side 36. Appropriate stops are provided for limiting movement of the catwalk assembly to these positions. As best shown in FIG. 8, the railing portion 108 includes a railing base 110, a railing bar 112, and a plurality of spaced extendable supports 114 connecting the railing bar and the railing base. A suitable cover 115 or wind shield, which could be of either fabric construction or a panel, can be detachably mounted to the outside of the railing portion 108 to provide shelter from wind and/or rain. Side awnings 116, similar to awning 84 except having a second, intermediate hinge 118, are also provided extending over the open catwalk assemblies. Furthermore, the lower section of the side awning could be pivoted about the intermediate hinge to extend vertically, overlapping the cover 115. Heavy canvas curtains can be draped over the ends of the catwalks opposite the service bay entrance to provide an enclosed heatable shelter for the service personnel.

Operation of the trailer 20 of the present invention is as follows. After the trailer is moved to the service site, the trailer can be unhitched from the tow vehicle 22, the forward end 32 of the trailer being supported by jacks 120, as shown in FIGS. 2 and 7. The operator can then reconfigure the trailer from its closed, over-the-road, condition to its open or use condition. First the operator can lower the gate 82 permitting his access to the service bay 24. He can then raise the forward awning 84 and pivot the corner post assemblies 52, 54 to their open positions. Next the operator can lift the side awnings 116 and move the catwalk assemblies 100 to their open positions. Thereafter, the attendant can move the portable car ramps from inside the service bay 24, causing them to extend over the gate 80 and to ground level thereby making the trailer ready to start accepting vehicles to be serviced. It will be appreciated that the time required to reconfigure the trailer between its open and closed conditions is minimal and that the trailer configuration provides adequate shelter for the service worker in most weather conditions.

Referring to FIG. 9, an alternate embodiment of the trailer of the present invention is shown by reference character 20A. Components of trailer 20A corresponding to components to trailer 20 are identified by the reference numeral assigned to the component of trailer 20 with the addition of the suffix quotation "A". In general, the trailer 20A represents a simplified version which includes a corner post assembly 52A at each corner of the trailer frame 20A. Thus while the trailer 20A may not include a storage area, it permits entrance of the vehicle to be received from either the forward end 32A or the rearward end 34A of the trailer. This configuration also permits a "drive through" type of operation.

A second alternative embodiment of the trailer of the present invention is shown in FIG. 10 by reference character 20B. Trailer 20B is a "5th wheel" or "gooseneck" type trailer in which the entrance to the service bay 24B is at the rear of the trailer. The storage area 26B is at the front of the trailer so that the weight of the equipment and supplies carried in the trailer is more effectively applied to the rear wheels of the tow vehicle.

Figure 13:
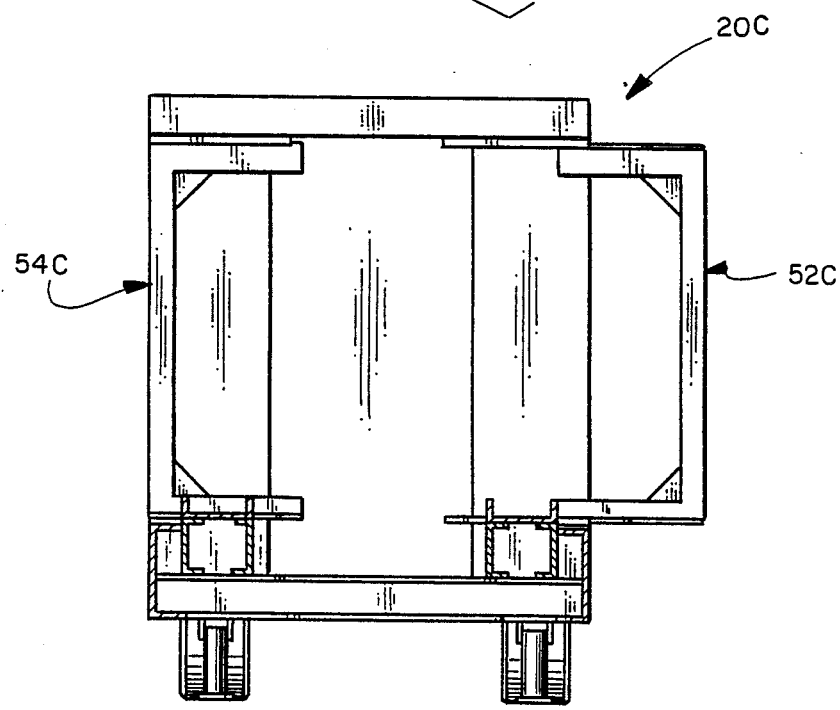
FIG. 13 is a front elevational view of the trailer of FIG. 11 depicting one corner post in its extended position and the other corner post in its retracted position.

A third alternative embodiment of the trailer of the present invention is shown in FIGS. 11 and 13 by reference character 20C. The primary difference between the FIGS. 1-4A main embodiment 20 and the third alternative embodiment 20C is that the corner post assemblies 52C and 54C slide rather than rotate with respect to the floor and roof. More specifically, as best shown in the detail of FIG. 12, the roof 42C carries a depending track 122 adjacent the forward end 32C and extending intermediate the trailer side walls 44C and 46C. The upper arm 56C of each corner post assembly carries a rail 124 including an upper flange 126 for being held and slidably guided by the track 122. Similarly, another track 122 is attached to the frame, and the lower arm 58C carries a rail 124 having a flange 126 for guided sliding movement by the last-mentioned track. FIG. 13 illustrates the corner post assembly 52C in its extended position, and corner post assembly 54C in its retracted position. It will be appreciated that the corner post assemblies can be made part of structures including components of the side wall, awning, and catwalk to form a slide out assembly as shown in FIG. 11.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. Mobile service apparatus which may be moved from a first location to a second location, said apparatus comprising:
    a frame including a floor onto which a vehicle to be serviced can be moved, said frame having a forward end, a rearward end, and two spaced sides extending between said ends;
    a roof supported by said frame and overlying said floor; and
    at least one roof support assembly positioned adjacent one end of said frame and adjacent one side of said frame for maintaining said roof spaced above said floor, said roof support assembly including a horizontally extending upper arm movably held by said roof, a horizontally extending lower arm movably held by said frame and underlying said upper arm, and a spacer joining said upper and lower arms, said roof support assembly being movable between a closed position wherein said spacer is disposed between said frame sides and an open position in which said spacer is located outwardly of said one frame side whereby, with said assembly in the open position thereof, a vehicle extending beyond said one frame side can be moved onto said floor without interference from said roof support assembly.

2. Apparatus as set forth in claim 1 wherein said apparatus is a mobile service trailer, wherein said frame is supported on wheels, and wherein said roof support assembly is a corner post assembly.

3. Apparatus as set forth in claim 2 further comprising another said corner post assembly positioned adjacent said one end of said frame and adjacent the other side of said frame.

4. Apparatus as set forth in claim 3 wherein said trailer has side walls, each of said side walls having a cutout portion extending from said one end of said frame whereby, with said corner post assemblies in the open positions thereof, a vehicle extending beyond both frame sides can be moved onto said floor.

5. Apparatus as set forth in claim 2 wherein said upper arm includes a distal end pivotally connected to said roof, said lower arm includes a distal end pivotally connected to said frame, and said spacer joins proximal ends of said arms.

6. Apparatus as set forth in claim 2 wherein said corner post assembly comprises a shield extending away from said frame when said corner post assembly is in the open position thereof.

7. Apparatus as set forth in claim 6 wherein said shield includes a generally horizontally disposed plate extending from said upper arm, and a generally vertically disposed plate extending from said spacer.

8. Apparatus as set forth in claim 2 wherein said corner post assembly comprises a strengthening fillet joining said upper arm and said spacer.

9. Apparatus as set forth in claim 2 wherein said corner post assembly comprises a strengthening fillet joining said lower arm and said spacer.

10. Apparatus as set forth in claim 2 further comprising a generally L-shaped catwalk assembly including a walkway portion having a first side and a second side and a railing portion extending away from said walkway portion adjacent the second side thereof, said walkway portion first side being pivotally connected to said frame adjacent said one side thereof, said catwalk assembly being swingable between a closed position thereof wherein it is disposed between said frame sides and an open position thereof wherein it extends beyond said one frame side.

11. Apparatus as set forth in claim 10 further comprising a cover for placement over said railing portion.

12. Apparatus as set forth in claim 10 wherein said railing portion includes a railing base, a railing bar, and a plurality of spaced extendable supports connecting said railing base and said railing bar.

13. Apparatus as set forth in claim 2 wherein said upper arm includes a distal end slidably connected to said roof, said lower arm includes a distal end slidably connected to said frame, and said spacer joins proximal ends of said arms.

14. Apparatus as set forth in claim 13 wherein said trailer has side walls, and wherein said roof carries a depending track adjacent said one end of said frame and extending intermediate said side walls.

15. Apparatus as set forth in claim 14 wherein said upper arm carries a flange for being held and slidably guided by said track.

16. A mobile service vehicle adapted for movement from a first location to a second location, said vehicle comprising:
  a frame supported on wheels, said frame including a floor onto which a vehicle to be serviced can be moved, said frame having a forward end, a rearward end, and spaced sides extending between said ends;
  a roof supported by said frame and overlying said floor; and
  at least one corner post assembly positioned adjacent one end of said frame and adjacent one side of said frame for maintaining said roof spaced above said floor, said corner post assembly including a horizontally extending upper arm movably held by said roof, a horizontally extending lower arm movably held by said frame and underlying said upper arm, and a spacer joining said upper and lower arms, said corner post assembly being movable between a closed position wherein said spacer is disposed between said frame sides and an open position in which said spacer is located outwardly of said one frame side whereby, with said assembly in its open position, a vehicle extending beyond said one frame side can be moved onto said floor without interference from said corner post assembly.

17. A vehicle as set forth in claim 16 including four of said corner post assemblies.

18. A vehicle as set forth in claim 16 wherein said one end of said frame is said forward end.

19. A mobile service trailer which may be pulled by a tow vehicle from a first location to a second location, said trailer comprising:
  a frame supported on wheels, said frame including a floor onto which a vehicle to be serviced can be moved, said frame having a forward end, a rearward end, and two spaced sides extending between said ends;
  a roof supported by said frame and overlying said floor;
  a pair of corner post assemblies positioned adjacent one end of said frame with one assembly positioned adjacent each side of said frame for maintaining said roof spaced above said floor, each corner post assembly including a horizontally extending upper arm movably held by said roof, a horizontally extending lower arm movably held by said frame and underlying said upper arm, and a spacer joining said upper and lower arms, each said corner post assembly being movable between a closed position wherein said spacer is disposed between said frame sides and an open position in which said spacer is located outwardly of the frame sides; and
  a generally L-shaped catwalk assembly including a walkway portion having a first side and a second side and a railing portion extending away from said walkway portion adjacent the second side thereof, said walkway portion first side being pivotally connected to said frame intermediate said frame ends and adjacent one side thereof, said catwalk assembly being swingable between a closed position thereof wherein it is disposed between said frame sides and an open position thereof wherein it extends beyond said one frame side.

20. A mobile service trailer as set forth in claim 19 further comprising means enclosing said catwalk assembly whereby an interior of said trailer can be heated.

* * * * *